(12) United States Patent
Alexandrov et al.

(10) Patent No.: US 8,750,592 B2
(45) Date of Patent: Jun. 10, 2014

(54) IMAGE ANALYSIS

(75) Inventors: Yuriy Alexandrov, Cardiff (GB); Simon Laurence John Stubbs, Cardiff (GB)

(73) Assignee: GE Healthcare UK Limited, Amersham (GB)

( * ) Notice: Subject to any disclaimer, the term of this patent is extended or adjusted under 35 U.S.C. 154(b) by 198 days.

(21) Appl. No.: 13/375,273

(22) PCT Filed: Jun. 1, 2010

(86) PCT No.: PCT/EP2010/057651
§ 371 (c)(1),
(2), (4) Date: Jan. 18, 2012

(87) PCT Pub. No.: WO2010/139697
PCT Pub. Date: Dec. 9, 2010

(65) Prior Publication Data
US 2013/0101199 A1    Apr. 25, 2013

(30) Foreign Application Priority Data
Jun. 2, 2009 (GB) .................................. 0909461.6

(51) Int. Cl.
*G06K 9/00* (2006.01)

(52) U.S. Cl.
USPC ......................................................... 382/133

(58) Field of Classification Search
None
See application file for complete search history.

(56) References Cited

U.S. PATENT DOCUMENTS

| 6,134,354 | A | 10/2000 | Lee et al. | |
|---|---|---|---|---|
| 2001/0023419 | A1* | 9/2001 | Lapointe et al. | 706/15 |
| 2005/0240357 | A1* | 10/2005 | Minor | 702/20 |
| 2007/0025611 | A1 | 2/2007 | Kanda et al. | |

FOREIGN PATENT DOCUMENTS

| JP | 08-254501 | 10/1996 |
|---|---|---|
| JP | 2002-142800 | 5/2002 |
| JP | 2006-293820 | 10/2006 |
| WO | WO 91/15826 | 10/1991 |
| WO | WO 2004/088574 | 10/2004 |
| WO | WO 2006/055413 | 5/2006 |

OTHER PUBLICATIONS

Kapelner, A., et al., "An Interactive Statistical Image Segmentation and Visualization System" IEEE Conference on Medical Information Visualization-Biomedical Visualization, Jul. 1, 2007, pp. 81-86.
Wang, J., et al., "Active microscopic cellular image annotation by superposable graph transduction with imbalanced labels" IEEE Conference on Computer Vision and Pattern Recognition, Jun. 23, 2008, pp. 1-8.

(Continued)

*Primary Examiner* — Atiba O Fitzpatrick

(57) ABSTRACT

A first aspect of the invention relates to an apparatus 100 for genotoxicological screening. The apparatus 100 comprises a processor 114 for analyzing images. The processor 114 is configured to provide an identifier module 115 for identifying target cells in an image and a dynamically modifiable classifier module 116 for classifying the identified cells in accordance with one or more phenotype, such as micronuclei, for example. The processor 114 is also configured to provide a scoring module 117 for assigning respective confidence measurements to the classified cells. Various aspects and embodiments of the invention may be used, for example, to provide for improved reliability and accuracy when performing automated high-throughput screening (HTS) drug assays.

12 Claims, 2 Drawing Sheets

(56) References Cited

OTHER PUBLICATIONS

Nattkemper, T., et al., "A Neural Classifier Enabling High-Throughput Topological Analysis of Lymphocytes in Tissue Sections" IEEE Transactions on Information Technology in Biomedicine, vol. 5, No. 2, Jun. 1, 2001, pp. 138-139.

Jones, T. R., et al., "Scoring Diverse Cellular Morphologies in Image-Based Screens with Iterative Feedback and Machine Learning" Proceedings of the National Academy of Sciences of the US, vol. 106, No. 6, Feb. 10, 2009, pp. 1826-1831.

Carpenter, A., et al., "Cell Profiler: image analysis software for identifying and quantifying cell phenotypes" Genome Biology, vol. 7, No. 10, Oct. 31, 2006, p. R100.

"Fisher Linear Discriminant" In: Duda, Hart, Stork: "Pattern Classification" Nov. 1, 2000, Wiley-Interscience, pp. 117-121.

"Weighted Majority Vote" In: L. I. Kuncheva: "Combining Pattern Classifiers" 2004, Wiley-Interscience, pp. 123-125.

Rausch, et al., "High Content Cellular Screening" Current Opinion in Chemical Biology, vol. 10, No. 4, Aug. 1, 2006, pp. 316-320.

Haney, et al., "High-Content Screening Moves to the Front of the Line" Drug Discovery Today, vol. 11, No. 19-20, Oct. 1, 2006, pp. 889-894.

"PlayStation 3 gamers can aid medical research, Sony says" The Sydney Morning Herald, Nov. 17, 2006, retrieved Aug. 11, 2010 from the internet: URL:http://www.smh.com.au/news/Technology/PlayStation-3-fetching-mostly-hohum-prices-on-Japan-Net-auctions/2006/11/10/1162661892292.html.

Notice of Preliminary Rejection Issued Feb. 4, 2014 on Corresponding JP Patent Application No. 2012-513601.

\* cited by examiner ns a filing under 35 U.S.C. §371 and claims
IMAGE ANALYSIS

CROSS-REFERENCE TO RELATED APPLICATIONS

This application is a filing under 35 U.S.C. §371 and claims priority to international patent application number PCT/EP2010/057651 filed Jun. 1, 2010, published on Dec. 9, 2010 as WO 2010/139697, which claims priority to application number 0909461.6 filed in Great Britain on Jun. 2, 2009.

FIELD OF THE INVENTION

The present invention relates generally to image analysis. More particularly, the present invention relates to apparatus and methods for improved automated image analysis to identify the presence of certain phenotypes, such as, for example, micronuclei, that might be seen in various images.

BACKGROUND OF THE INVENTION

The combination of recent advances in fluorescent probe technologies, automation of epifluorescent microscopy and image analysis has enabled high-content screening (HCS) to become a useful tool in the assessment of compound toxicity. For example, the detection of micronuclei (MN) in vitro may be used as a test of genotoxicity for biomonitoring, mutagenicity testing and to assess the proficiency of DNA-repair [1].

Currently, pharmaceutical genotoxicity units are governed by regulatory requirements and in vitro micronuclei tests can have a significant impact upon late stage developmental drugs where high costs have already been incurred. For example, the FDA/ICH currently require: i) a test for gene mutation in bacteria (Ames, or similar); ii) an in vitro test with cytogenetic evaluation of chromosomal damage (usually MN or chromosome aberration assays, MN may be used as a predicator of the mouse lymphoma assay) with mammalian cells or an in vitro mouse lymphoma assay; and iii) an in vivo test for chromosomal damage using rodent haematopoietic cells (in vivo bone marrow mouse MN). In vitro MN results can thus influence decisions regarding further downstream toxicity testing and entry into clinical trials, lead-modification or drug withdrawal.

Groups that are subject to regulatory approval adhere to guidelines and integrate a number of genotoxicity assays to ensure compliance and high confidence in detection sensitivity and specificity. Compounds are not progressed if there is evidence of genotoxicity even where it may be questionable and there is no knowledge of the interaction mechanism. Accuracy and precision of MN scoring are paramount to provide a sensitive, specific solution.

Whilst various conventional systems [2, 3] can help such groups with the screening processes, more current conventional systems and methods [4] may be highly dependent upon expert user input to help classify whether or not various image features are or are not, for example, micronuclei.

Other automated systems for classifying biological specimens are known in the prior art. Lee et al. [5] describes an automated microscope system comprising a computer and high speed processing field processor to identify free-lying cells. Long et al. [6] relates to algorithms that automatically recognise viable cells. The document discloses a method of identifying and localizing objects belonging to one of three or more classes, including deriving vectors, each being mapped to one of the objects, where each of the vectors is an element from an N-dimensional space. The method includes training an ensemble of binary classifiers with CISS technique, using training sets generated with an ECOC technique. Rutenberg [7] describes an automated cytological specimen classification system and method for increasing the speed and accuracy of cervical smear analysis. However, all of the above systems and methods [5, 6 and 7] are "pre-trained" in the sense that classification is based on pre-set criteria and thus the systems and methods do not improve with use.

Accordingly, there is a need to provide improved systems and methods that can more rapidly and accurately identify potential significant features of interest, for example, in an automated screening process or device. In particular, there is a need for improved systems and methods which are dynamically modifiable in the sense that they use algorithms which continuously learn, through for example human intervention or from other processors, and thus become more accurate with time.

SUMMARY OF THE INVENTION

The present invention has thus been devised whilst bearing the above-mentioned drawbacks associated with conventional devices and techniques in mind.

According to a first aspect of the present invention, there is thus provided an apparatus for genotoxicological screening. The apparatus comprises a processor that is configured to provide an identifier module for identifying target cells in an image, a classifier module for classifying the identified cells in accordance with one or more phenotype, and a scoring module for assigning respective confidence measurements to the classified cells.

According to a second aspect of the present invention, there is provided a method for classifying cells in an image according to one or more phenotype. The method comprises identifying candidate target cells in an image, classifying the identified target cells according to one or more phenotype, and scoring the classified cells.

Certain aspects and embodiments of the present invention also provide various computer program products for configuring a data processing apparatus to implement various of the functions needed to provide an apparatus or method in accordance with the aforementioned first and second aspects of the present invention.

As described in further detail below, various aspects and embodiments of the present invention are able to improve the accuracy of automated feature identification, e.g. in HCS, by substantially reducing the number of false negative identifications that are detected in an image. For example, when screening images to detect micronuclei indicative of potentially toxic drug compounds such false negative readings may mean that a possibly useful compound is ruled out from further testing by error. Reduction of the number of false negative identifications is thus highly desirable.

DETAILED DESCRIPTION OF THE INVENTION

Figure 1:
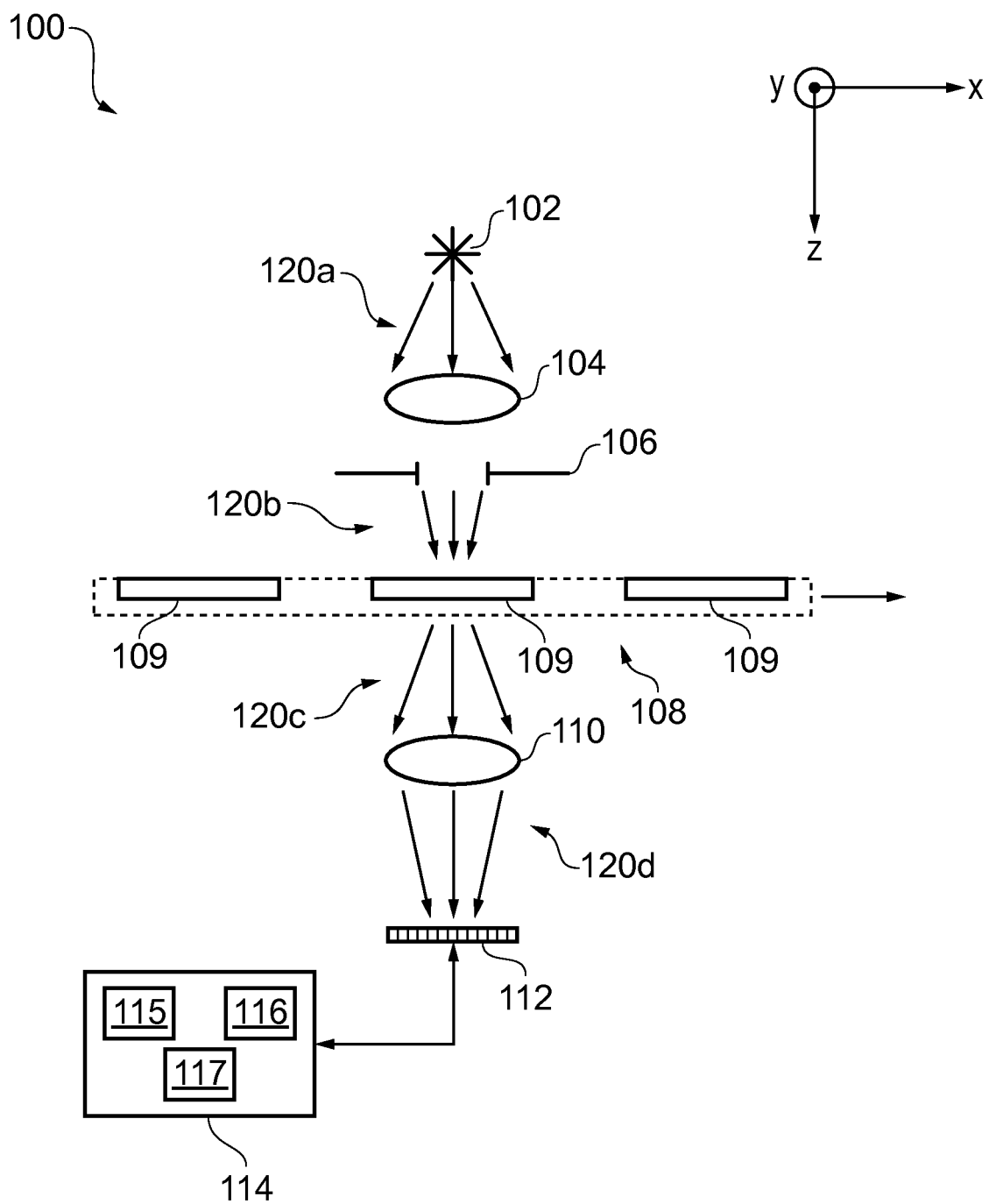
FIG. 1 shows an apparatus for genotoxicological screening in accordance with an embodiment of the present invention.

FIG. 1 shows an apparatus 100 for genotoxicological screening in accordance with an embodiment of the present invention. Genotoxicological screening may, for example, be provided by identifying the presence or absence of one or more phenotypes, such as micronuclei, that may be present in images of treated cells. The apparatus 100 may also be used, for example, for automated high-content screening (HCS) and/or high-throughput screening (HTS). Micronuclei are small nuclei containing chromatin, separate from and additional to the main nuclei of cells, produced during telophase of mitosis (or meiosis) by lagging (slower motility during chromosome segregation) chromosome fragments or whole chromosomes The apparatus 100, which is illustrated schematically for clarity, comprises a light source 102 for producing light 120a. The light 120a is focussed by a condenser 104 onto a test plate 108. The test plate 108 may contain an array of wells or spots 109 to be imaged. The condenser 104 can focus the light 120b in a focal plane at the test plate 108. The test plate 108 may be provided as a consumable product, and the spots 109 might contain various materials that are able to interact with certain types of cells (e.g. mammalian cells).

In various embodiments, the test plate 108 may comprise at least one fiducial marker (not shown) provided to aid in aligning the test plate 108 within the apparatus 100. For example, one or more coloured dyes may be provided within the spots 109. Such coloured dyes can be identified by various imaging systems in order to derive data relating to the relative positioning of the test plate 108 within the apparatus 100. For example, the apparatus 100 may include a GE In-Cell Analyzer 1000™ that is commercially available from GE Healthcare Life Sciences, Little Chalfont, Buckinghamshire, U.K., and which can use four colour channels to image the test plate 108. One colour channel may thus be dedicated to imaging coloured fiducial markers provided in various of the spots 109 in order to obtain data relating to the positioning of the test plate 108 within the apparatus 100.

The apparatus 100 also contains a detector system 112 and a translation mechanism (not shown). The translation mechanism is configured to move the focus of the light 120b relative to the test plate 108 (e.g. by moving the test plate 108 in the x-y plane). This enables a plurality of images to be acquired from respective of the individual spots 109. Additionally, the translation mechanism may also be operable to move the test plate 108 in the z-direction shown in FIG. 1, for example, in order to bring the spots 109 into focus.

For certain embodiments, only one spot is imaged at a time. The images acquired are of sufficient magnification to resolve cells and sub-cellular morphology. With the current GE In-Cell Analyzer 1000™, this may entail use of a 20× objective, the field of view of which is slightly smaller than a single spot. However, various methods of the invention would also work for lower power magnification imaging, e.g. on GE In-Cell Analyzer 1000™ using a 4× objective to image 4-6 spots/image.

An aperture stop 106 is optionally provided between the light source 102 and the detector system 112, the size of which may be variable. For example, various differently sized movable apertures may be rotated into position or a continuously variable iris-type diaphragm may be provided. Image contrast can be controlled by changing the aperture setting of the aperture stop 106.

Focussed light 120b passing through the aperture stop 106 passes through the sample test plate 108 in a transmission imaging mode. Emergent light 120c modulated with image information relating to material adjacent to an individual spot 109 is collected by an objective lens 110 and focussed 120d onto the detector system 112, and is used to form an original image for that spot 109.

Various embodiments of methods of the present invention are independent of the imaging modality used, e.g. they can operate with transmission or reflection geometry. For GE In-Cell Analyzer 1000™ imaging an epi-fluorescence mode may be used, with both the fiducial marker spots and the assay signals from the cells being imaged at different excitation and emission wavelengths. However there is nothing in principle to prevent a mix of imaging modes being deployed, provided that they do not interfere. For example, it would be possible to use a non-fluorescent dye for fiducial marking and to detect the fiducial marks by absorbance in reflectance or transmission geometry, while detecting assay signals by epi-fluorescence.

The detector system 112 is operable to acquire a plurality of images from the test plate 108. For example, images may be obtained each representing different spots 109 or of the same spot 109 at different points in time. Differences between neighbouring spots 109 or temporal changes occurring within the same spot 109 can thus be analysed.

The detector system 112 is also operably coupled to a processor 114 that in turn is operable to process the images. Analysis of the images may be used to provide for genotoxicological screening. Of course, such images may be generated by the apparatus 100 itself or might be provided from storage and/or transmitted to the processor 114 from a remote location (not shown).

The processor 114 is configured to provide an identifier module 115 for identifying target cells in an image, a classifier module 116 for classifying the identified cells in accordance with one or more phenotype, and a scoring module 117 for assigning respective confidence measurements to the classified cells.

The identifier module 115 segments individual cell images from whole images, that might contain images of many such cells, to provide a set of target cells that have been identified in the images. For example, a pattern recognition or thresholding technique may be used [1, 8, 9]. Cells may be segmented and multi-parametric cellular data provided.

The classifier module 116 analyses the content of the individual identified cells. The content of the cell image is tested to determine the presence or absence of one or more phenotype. In this embodiment, the classifier module 116 checks the cell images for the presence or absence of micronuclei in accordance with an initial predetermined classification scheme. The initial classification scheme may, for example, be determined following the application of a training algorithm that is provided and shipped as part of a new GE In-Cell 1000™ apparatus [10].

Initial classification may be provided using a predetermined set of classification criteria, and cells may be annotated with graphical-cluster or multi-cell methods, for example.

Additionally, the classifier module 116 is dynamically modifiable. For example, the classifier module 116 may be operable to modify various criteria, such as threshold values and/or phenotypes that are analysed at run-time. Such a dynamically adaptable classifier module 116 can thereby evolve over time to re-classify the cell images in order to reduce the incidence of false negatives, which are highly undesirable. Moreover, the classifier module 116 may further adapt its behaviour automatically in response to certain user input, e.g. where a user has determined that a false positive classification of a cell image has been made.

The scoring module 117 generates scores indicative of the degree of confidence that a particular imaged cell possesses the target phenotype(s). In this embodiment the scoring module 117 is operable to apply a canonical variate analysis (CVA) to determine the respective confidence measurements for respective classified cells [11]. However, in general, a confidence rating may be defined without CVA. For example, the K-NN method may be used when classifying an unknown pattern, which looks for the nearest patterns from a training set, and arranges voting. For example, if K=5 and there are 3 classes (A, B, C) then for a pattern that scored A=1, B=2, C=2, among 5 neighbours, classification is problematic (e.g. B or C?). In this case, distance measures can be applied. In general though, problematic patterns are located at the periphery of corresponding clusters in the parameter space, and use of CVA is advantageous as it helps optimise the geometry of inter-cluster separation.

In this embodiment CVA may thus be employed to optimise the parameter choice and maximise separation of classes based upon initial training and/or any annotation of the image data. CVA analysis results may be reported in the form of a confidence rating which indicates the reliability of each individual cell belonging to the particular class into which it has been categorised by the initial process.

Optionally, users may be given the option to highlight "questionable" cells, such as, for example: those that are not easily categorised according to a user defined set of descriptors; those that have a confidence rating lower than a certain user-defined threshold value; or in the case of micronuclei scoring all cells in a particular class e.g. those potentially containing micronuclei.

The system 100 may flag any questionable cells and request verification (e.g. re-annotation) from either a user or other processor. For example, images of such cells might "pop-up" on a display for visual user clarification of a class. The system 100 may also be operable to permit a complete re-annotation of identified cell images, for example, where there is a change in biological protocol or throughput needs are low. Additionally, verification may result in re-classification of a cell and/or definition of an alternate class.

Training information that is supplied subsequently may be incorporated into a classification routine to facilitate better informed decisions with improved confidence. Such a routine may be embodied in an algorithm that provides constantly improving decisions having both increased specificity and sensitivity. Such an algorithm may thus never need to flag the same cell more than once and hence overall processing speed also increases over time.

In various aspects, visualisations of the training set data overlaid with "unknown" data can help in assessing the efficiency of the processing, as well as identification of various drug effects from the analysis of the distribution of "underrated" patterns around the datasets in training data corresponding to the pre-defined classes. In the case of presentation of unknown data with available manual scorings, for example, a matching matrix may be calculated on-the-fly and/or as a post-annotation step that defines correlation between manual and supervised learning classification.

In certain variants of this embodiment, the processor 114 is further operable to exchange data with other similar processors and the scoring module 117 is operable to derive respective consensus confidence measurements for respective classified cells from corresponding confidence score ratings provided by a plurality of scoring modules of respective processors.

By using networked processors, for example, the combined experience of many different adaptive learning systems can automatically be combined to further improve the accuracy in identifying various phenotypes. Such experience might be weighted in an overall score combined from individual scores for each contributor determined, for example, according to how long a particular contributing machine has been operating, how many separate image analyses a specific machine has performed, how many modifications or reclassifications have been applied for a particular machine since initial training, etc.

Hence in certain embodiments, processor 114 may act as a server device and transmit requests and image data to remote devices that are not necessarily trained with the same training data. The processor 114 is then operable to determine a consensus score for classifying its localised image data thereby providing improved confidence scoring and accuracy when classifying various phenotypes of interest. Such analysis may be performed automatically, without the need for specific user input or instructions.

The aggregated score may be generated as a weighted average of analyses of the same images(s) by different processors. Data may be transmitted between processors, for example, anonymously over a virtual private network (VPN) or via the Internet using a secure socket layer (SSL) channel to prevent specific detailed information being accessible to remote users of the system or other network users.

In certain variants, additional processing is performed remotely by distributed processors as a relatively low priority background task. This enables all users of the distributed processing system to benefit from the collective experience and processing power of all networked processors to provide improved classification scoring without unduly burdening individual processors operating locally. For example, distinct machines of a particular business, research institute, University, etc., may be linked either to each other institutionally or externally to form a global network.

Additionally, the processor 114 can be configured to control a translation mechanism (not shown) to move the focal position of the light source 102 relative to the spot plate 108. The processor 114 may, for example, be provided as part of a conventional computer system appropriately programmed to implement one or more of the identifier module 115, the classifier module 116 and the scoring module 117, or may be provided by a digital signal processor (DSP), dedicated application specific integrated circuit (ASIC), appropriately configured firmware, etc.

Various embodiments of the invention may thus be used to screen cells to detect micro-nucleation events that are indicative of drug toxicity. Improved classification improves screening and identification of potentially toxic drug compounds. In turn, such improved screening can reduce the need to test various compounds, for example pharmaceutical compounds that need to be tested on human or animal models, by eliminating the number of false negatives detected in an automated initial screening process.

In certain embodiments, the apparatus 100 as described above may be used to implement the following method that is described below in connection with FIG. 2.

Figure 2:
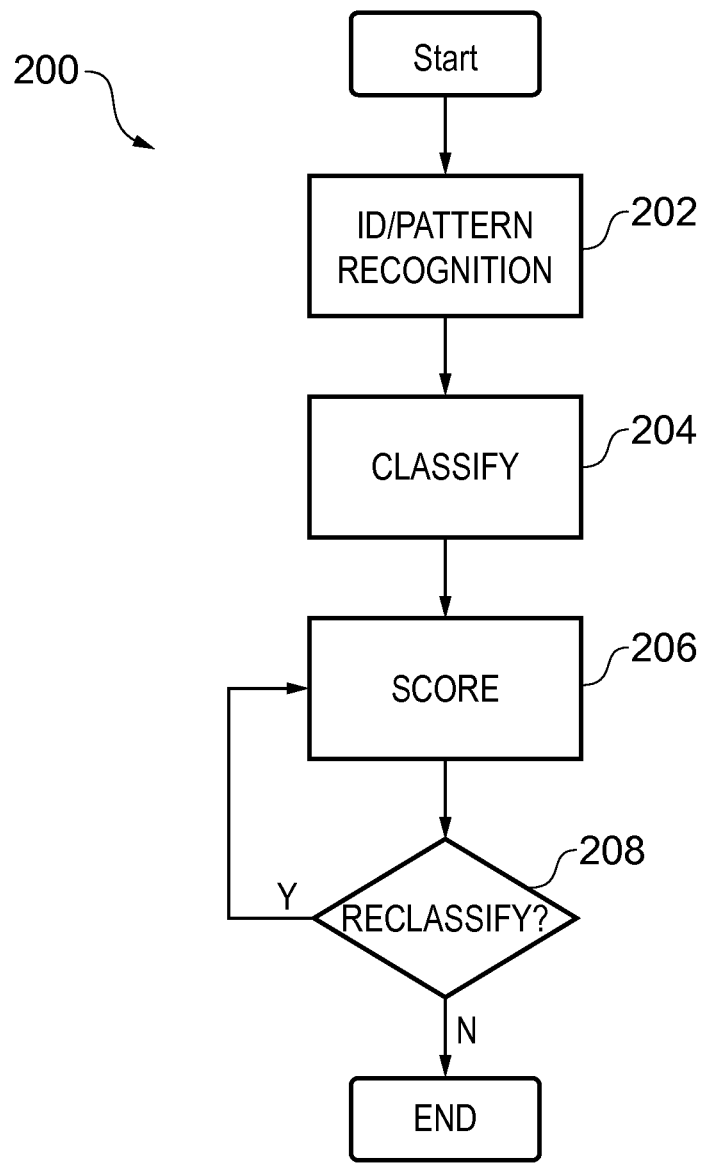
FIG. 2 shows a method for classifying cells in an image according to one or more phenotypes in accordance with various aspects and embodiments of the present invention.

FIG. 2 shows a method 200 for classifying cells in an image according to one or more phenotypes in accordance with various aspects and embodiments of the present invention. The method 200 may, for example, be applied for automatic classification and scoring of cell phenotypes depicted in the image.

Classes may initially be defined and training and/or annotation applied to refine class definitions. For example, cluster and/or visual multi-cell annotation may be used. A classifier may thus be built, e.g. using CVA and plots, to optimise the parameter choice and class differentiation.

The method 200 comprises a first step 202 of identifying candidate target cells in an image. Then at second step 204 the method 200 applies classifying of the identified target cells according to one or more phenotype, such as micronuclei for example, before scoring the classified cells in the next step 206.

In certain embodiments, the first step 202 entails identifying and segmenting the candidate target cells using pattern recognition. For example, cells may be segmented and analysed to produce multi-parametric cellular data [8, 10, 12, 13].

Classification may be performed at step 204 using a variety of pattern recognition techniques [9, 14]. For example, supervised techniques such as: linear and quadratic discriminant analysis; neural networks; K-nearest neighbours; support vector classifiers; tree-based methods; etc. and/or unsupervised methods like: k-means; self-organised maps; etc. may be used.

In certain embodiments, step 204 comprises deriving respective consensus confidence measurements for respective classified cells from corresponding confidence score ratings provided by a plurality of processors. Collaborative classification and/or scoring may thus be applied in order to further improve the overall accuracy of phenotype determination.

Scoring may also be provided at step 206 using a number of techniques. For example, scoring of the classified cells can be done by using a canonical variate analysis (CVA) to define a confidence rating for each respective classified cell. CVA is generally described by Tofallis [11].

Given a specific grouping (clustering) of data in a particular feature space, the CVA method applies a clustering dependent coordinate transformation [15]. The resulting effective coordinates have the same dimensionality as the original feature space, but provide maximal inter-cluster separation (i.e. minimising intra-cluster and maximising inter-cluster distances of the various patterns).

CVA can also be applied to optimise a choice of descriptors and maximise the separation of classes based upon an initial training/annotation data set. A confidence rating is then determined for each cell in the image to indicate the reliability of its belonging to the particular class into which it is categorised by the initial classification process.

For example, one simple confidence rating for a categorised pattern P is the difference between decision function g(P) of the "winner" class and the next closest to it from among the other classes, such that:

$$ConfidenceRating_{winner}(P) = \min_{\forall k \neq winner} [g_{winner}(P) - g_k(P)] \quad \text{Equation (1)}$$

where k is the running index of classes and winner is the index of the "winner" class.

In the illustrated embodiment, method 200 optionally comprises an additional step 208 of reclassifying the scored classified cells, for example, periodically and/or at event-driven times. Reclassification may be provided when significant changes occur to an initial training data set such that the method 200 enables cell phenotype classification accuracy to improve over time as, for example, part of a dynamically evolving adaptive learning system. Such a system may, for example, evolve automatically in response to event-driven user and/or automated input.

Reclassifying of the scored classified cells may comprise reclassifying the cells by modifying a learning algorithm training data set in response to user weighting of the scoring applied to the classified target image areas initially by the method 200. For example, specific cells may be selected and reclassified by providing confidence values for each cell, selecting those requiring reclassification by applying predetermined threshold criteria, and optionally visually verifying the identity of the cells. Any verified cells may then be incorporated into a learning algorithm classifier to improve its speed and accuracy.

The method 200 may be used to determine whether changes occur between various images. For example, the method 200 can be used to detect drug induced-effects over time. These effects might be qualifiable/quantifiable, and may include phenomena and processes such as changes in size parameters, necrosis, mitosis (cell splitting) etc.

The method 200 can be used for automated image analysis e.g. in high-throughput screening (HTS) for drug assays or the like. The images used may comprise cellular data such as a microscope image.

The method 200 may be applied to images that have been previously stored, transmitted etc., or may acquired and processed "on-the-fly". The method 200 may be implemented using a processor comprising one or more of hardware, firmware and software. For example, the processor might use a conventional personal computer (PC), ASIC, DSP, etc., and/or the apparatus may include a GE In-Cell Analyzer 1000™ using GE's In-Cell Miner™ software package upgraded to implement the method 200. Additional functionality, as described herein, may also be provided by various embodiments that implement the method 200.

In various embodiments of the present invention, the method 200 can be implemented by an apparatus using various software components. Such software components may be provided to an apparatus in the form of an upgrade, for example, transmitted to the apparatus via the Internet.

Certain embodiments of the present invention may be provided which enable a plurality of users to connect to an apparatus in order that multiple users (e.g. humans and/or remote machines) can provide training data, for example, by scoring classified cells. Such embodiments enable an individual apparatus to be trained quickly with a peer-reviewed degree of confidence in the accuracy of the results. Moreover, such embodiments do not necessarily need to share the results analysed but merely training data, e.g. in the form of classification scores, etc., the former of which is often highly commercially sensitive but the latter of which may not be. In this manner more accurate and faster automated screening can be provided without compromising confidential assay-specific research data. Moreover, this technique is likely to produce more universally concordant classifications, which may be especially beneficial, for example, in an FDA regulated environment where, despite regulatory test guidelines, subjective interpretation, inter-scorer differences and temporal effects lead to systematic differences in results between groups and over extended time periods [16, 17].

Whilst the present invention has been described in connection with various embodiments, those skilled in the art will be aware that many different embodiments and variations are possible. All such variations and embodiments are intended to fall within the scope of the present invention as defined by the appended claims.

REFERENCES

1. WO 2007/063290 (GE Healthcare UK Limited)
2. U.S. Pat. No. 3,824,393 (Brain)
3. U.S. Pat. No. 5,989,835 (Dunlay)
4. Metafer MSearch™ available from MetaSystems™, Robert-Bosch-Strasse 6, D-68804, Altlussheim, Germany
5. U.S. Pat. No. 6,134,354 (Lee et al.)
6. WO 2006/055413 (Long et al.)
7. WO 91/15826 (Rutenberg)

8. GE Healthcare, "Multi Target Analysis Module for IN Cell Analyzer 1000," Product User Manual Revision A, Chapter 6, 2006
9. K. Fukunaga, "Introduction to Statistical Pattern Recognition," Second Edition, Academic Press Inc., 1990, ISBN 0122698517
10. GE Healthcare, "Multi Target Analysis Module for IN Cell Analyzer 1000," Product User Manual Revision A, Chapter 7, 2006
11. C. Tofallis, "Model Building with Multiple Dependent Variables and Constraints," The Statistician, Vol. 48, No. 3, pp. 371-378, 1999
12. WO 2004/088574 (Amersham Biosciences UK Ltd)
13. B. Soltys, Y. Alexandrov, D. Remezov, M. Swiatek, L. Dagenais, S. Murphy and A. Yekta, "Learning Algorithms Applied to Cell Subpopulation Analysis in High Content Screening," http://www6.gelifesciences.com/aptrix/upp00919.nsf/Content/WD:Scientific+Post(285564266-B653)
14. T. Hastie, J. Friedman and R. Tibshirani, "The Elements of Statistical Learning: Data Mining, Inference, and Prediction," Edition 9, Springer, 2007, ISBN 0387952845
15. D. M. Hawkins (Ed), "Topics in Applied Multivariate Analysis," National Research Institute for Mathematical Sciences, National Research Institute for Mathematical Sciences (South Africa), Cambridge University Press, 1982, ISBN 0521243688, p. 205
16. M. Fenech, S. Bonassi, J. Turner, et al, "Intra- and Inter-Laboratory Variation in the Scoring of Micronuclei and Nucleoplasmic Bridges in Binucleated Human Lymphocytes," Results of an International Slide-scoring Exercise by the HUMN project, Mutat. Res. (2003a), 534, 45-64
17. B. Patino-Garcia, J. Hoegel, D. Varga, M. Hoehne, I. Michel, S. Jainta, R. Kreienberg, C. Maier and W. Vogel, "Scoring Variability of Micronuclei in Binucleated Human Lymphocytes in a Case-control Study," Mutagenesis, 21(3):191-7, May 2006

Where permitted, the content of the above-mentioned references are hereby also incorporated into this application by reference in their entirety.

What is claimed is:

1. An apparatus (100) for automated genotoxicological screening, the apparatus (100) comprising a processor (114) configured to provide:
   an identifier module (115) for identifying target cells in an image;
   a dynamically modifiable classifier module (116) for classifying the identified cells in accordance with one or more phenotype; and
   a scoring module (117) for assigning respective confidence measurements to the classified cells,
   wherein the classifier module (116) is further operable to dynamically re-classify the scored classified cells by modifying a learning algorithm training data set in response to re-weighting of the scoring applied to the classified target cells.

2. The apparatus (100) of claim 1, wherein the one or more phenotype includes micronuclei that may be present in a respective identified cell.

3. The apparatus (100) of claim 1, wherein scoring module (117) is operable to apply a canonical variate analysis (CVA) to determine the respective confidence measurements for respective classified cells.

4. The apparatus (100) of claim 1, wherein the processor (114) is further operable to exchange data with other similar processors and the scoring module (117) is operable to derive respective consensus confidence measurements for respective classified cells from corresponding confidence score ratings provided by a plurality of scoring modules of respective processors.

5. The apparatus (100) of claim 1, wherein the classifier module (116) is dynamically modifiable to classify and/or re-classify cells in response to input from a plurality of users.

6. A method (200) for automatically classifying cells in an image according to one or more phenotype, the method (200) comprising:
   identifying (202) candidate target cells in an image;
   dynamically classifying (204) the identified target cells according to one or more phenotype;
   scoring (206) the classified cells, and
   reclassifying (208) the scored classified cells by modifying a learning algorithm training data set in response to re-weighting of the scoring applied to the classified target cells.

7. The method (200) of claim 6, wherein the one or more phenotype includes micronuclei.

8. The method (200) of claim 6, wherein identifying (202) candidate target cells in an image comprises identifying target cells by pattern recognition.

9. The method (200) of claim 6, wherein scoring (206) of the classified cells comprises using a canonical variate analysis (CVA) to define a confidence rating for each respective classified cell.

10. The method (200) of claim 6, wherein classifying (204) the identified target cells comprises deriving respective consensus confidence measurements for respective classified cells from corresponding confidence score ratings provided by a plurality of processors.

11. The method (200) of claim 6, comprising modifying the classification and/or re-classification criteria for cells in response to input from a plurality of users.

12. A non-transient computer readable medium containing program instructions for causing a data processing apparatus to implement the method (200) of claim 6.

* * * * *